United States Patent
Kawaguchi et al.

(10) Patent No.: US 11,934,427 B2
(45) Date of Patent: Mar. 19, 2024

(54) DATA CLASSIFICATION APPARATUS, DATA CLASSIFICATION METHOD AND PROGRAM

(71) Applicant: Nippon Telegraph and Telephone Corporation, Tokyo (JP)

(72) Inventors: Hidetoshi Kawaguchi, Musashino (JP); Yuichi Nakatani, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/792,769

(22) PCT Filed: Jan. 14, 2020

(86) PCT No.: PCT/JP2020/000902
§ 371 (c)(1),
(2) Date: Jul. 14, 2022

(87) PCT Pub. No.: WO2021/144852
PCT Pub. Date: Jul. 22, 2021

(65) Prior Publication Data
US 2023/0040784 A1    Feb. 9, 2023

(51) Int. Cl.
*G06F 16/28*    (2019.01)
*G06N 20/00*    (2019.01)

(52) U.S. Cl.
CPC .......... *G06F 16/285* (2019.01); *G06N 20/00* (2019.01)

(58) Field of Classification Search
CPC ....... G06F 18/217; G06F 16/285; G06N 5/04; G06N 3/084; G06N 5/045; G06N 20/00
See application file for complete search history.

(56) References Cited

U.S. PATENT DOCUMENTS

2021/0118024 A1*  4/2021  Sollami ............. G06Q 30/0603
2021/0334705 A1* 10/2021  Akbar ................... G06N 20/20

OTHER PUBLICATIONS

Kawaguchi et al., "Dummy training data generation method towards robust estimation of confidence value of semi-automatic agents for multi-class classification," JSAI 2019, Jun. 4, 2019, retrieved from URL <https://confit.atlas.jp/guide/event-img/jsai2019/4O3-J-7-04/public/pdf?type=in>, 7 pages (with English Translation).

* cited by examiner

*Primary Examiner* — Hau H Hoang
(74) *Attorney, Agent, or Firm* — Fish & Richardson P.C.

(57) ABSTRACT

A data classification apparatus includes a data transformation unit that generates a feature vector by using classification target data, a classification estimation process observation unit that acquires, from a classification estimation unit that estimates classification of the classification target data and including a plurality of weak classifiers, observation information in a classification process based on the feature vector, and generates a classification estimation process feature vector based on the observation information, and an error determination unit that determines, in accordance with an input of the classification estimation process feature vector generated by the classification estimation process observation unit and a classification result output from the classification estimation unit to which the feature vector is input, whether the classification result is correct.

9 Claims, 12 Drawing Sheets

Fig. 4

```
alert tcp $EXTERNAL_NET any -> $ HTTP_SERVERS $ HTTP_PORTS (msg:" WEB-PHP admin.php file upload attempt"; flow:to_server,established; uricontent:"/admin.php"; nocase; content:" file_name="; reference:bugtraq,3361; classtype:attempted-admin; sid:1300; rev:5;)
```

DATA CLASSIFICATION APPARATUS, DATA CLASSIFICATION METHOD AND PROGRAM

CROSS-REFERENCE TO RELATED APPLICATIONS

This application is a National Stage application under 35 U.S.C. § 371 of International Application No. PCT/JP2020/000902, having an International Filing Date of Jan. 14, 2020, the disclosure of which is considered part of the disclosure of this application, and is incorporated in its entirety into this application.

TECHNICAL FIELD

The present invention relates to a technique for classifying data.

BACKGROUND ART

There is a system called an intrusion detection system (IDS) for performing logging or providing a notification of malignant communication from the outside by pattern matching using a signature, and the like. In addition to the function of the IDS, there is a system called an intrusion prevention system (IPS) for also cutting off malignant communication.

The signature described above is a pattern file of communication to be used for pattern matching of the IDS/IPS. The IDS/IPS allows behavior when communication matches a certain signature to be set. For example, in a case of the IDS, logging, a notification, or the like can be used as the behavior that can be set, and in a case of the IPS, a cutoff can also be set in addition to logging, a notification, or the like.

Security operators who handle the IDS/IPS need to classify a signature used in the IDS/IPS. This classification corresponds to setting of behavior and the like when the IDS/IPS detects communication that matches the signature.

In recent years, the number of signatures themselves has increased significantly, and classification of the signatures has been difficult to be manually performed. To classify an enormous number of all signatures, it is considered to generate patterns from pairs of signatures and classification as learning data by using machine learning and the like, configure a classification estimation module, and automatically perform classification.

However, false classification cannot be avoided only by classification using the classification estimation module. A signature needs to be handled in a sensitive manner, and after all, the security operators must determine whether classification is correct.

CITATION LIST

Non Patent Literature

NPL 1: Kawaguchi and others, "Dummy Training Data Generation Method towards Robust Estimation of Confidence Value of Semi-automatic Agents for Multi-class Classification", The 33rd Annual Conference of the Japanese Society for Artificial Intelligence, 2019, June 2019, https://confit.atlas.jp/guide/event-img/jsai2019/4O3-j-7-04/public/pdf?type=in

SUMMARY OF THE INVENTION

Technical Problem

NPL 1 discloses a technique for estimating whether a probability of being correct is high (whether classification is correct) or whether a probability of being correct is low (whether classification is incorrect) with regard to classification in order to avoid using false classification. The existing technique disclosed in NPL 1 allows error determination to be performed, but better error determination accuracy is awaited. In other words, better classification accuracy is awaited.

In light of the foregoing, an object of the present invention is to provide a technique for accurately performing classification of data.

Means for Solving the Problem

The disclosed technique provides a data classification apparatus including a data transformation unit that generates a feature vector by using classification target data, a classification estimation process observation unit that acquires, from a classification estimation unit that estimates classification of the classification target data and including a plurality of weak classifiers, observation information in a classification process based on the feature vector and generates a classification estimation process feature vector based on the observation information, and an error determination unit that determines, in accordance with an input of the classification estimation process feature vector generated by the classification estimation process observation unit and a classification result output from the classification estimation unit to which the feature vector is input, whether the classification result is correct.

Effects of the Invention

The disclosed technique provides a technique for accurately performing classification of data.

BRIEF DESCRIPTION OF DRAWINGS

FIG. 4 is a diagram illustrating a specific example of a signature.

DESCRIPTION OF EMBODIMENTS

Hereinafter, an embodiment of the present invention (the present embodiment) will be described with reference to the drawings. The embodiments to be described below are merely exemplary, and an embodiment to which the present invention is applied is not limited to the following embodiments.

A data classification technique described below is applicable to various fields, and, for example, a security operator who handles a security system such as an IDS/IPS can apply the data classification technique for classifying a signature being a pattern file of malignant communication used in those systems.

Functional Configuration of Apparatus

A functional configuration of a data classification apparatus 100 according to the present embodiment will be described. The data classification apparatus 100 performs an operation in a learning phase of performing learning (parameter adjustment) of a classification estimation unit 130 and an error determination unit 150, and an operation in a classification phase of performing classification of classification target data using the classification estimation unit 130 and the error determination unit 150 that have been learned.

In the learning phase and the classification phase, the functional configuration of the data classification apparatus 100 is basically the same, but there is a difference in information to be processed.

Configuration in Learning Phase

Figure 1:
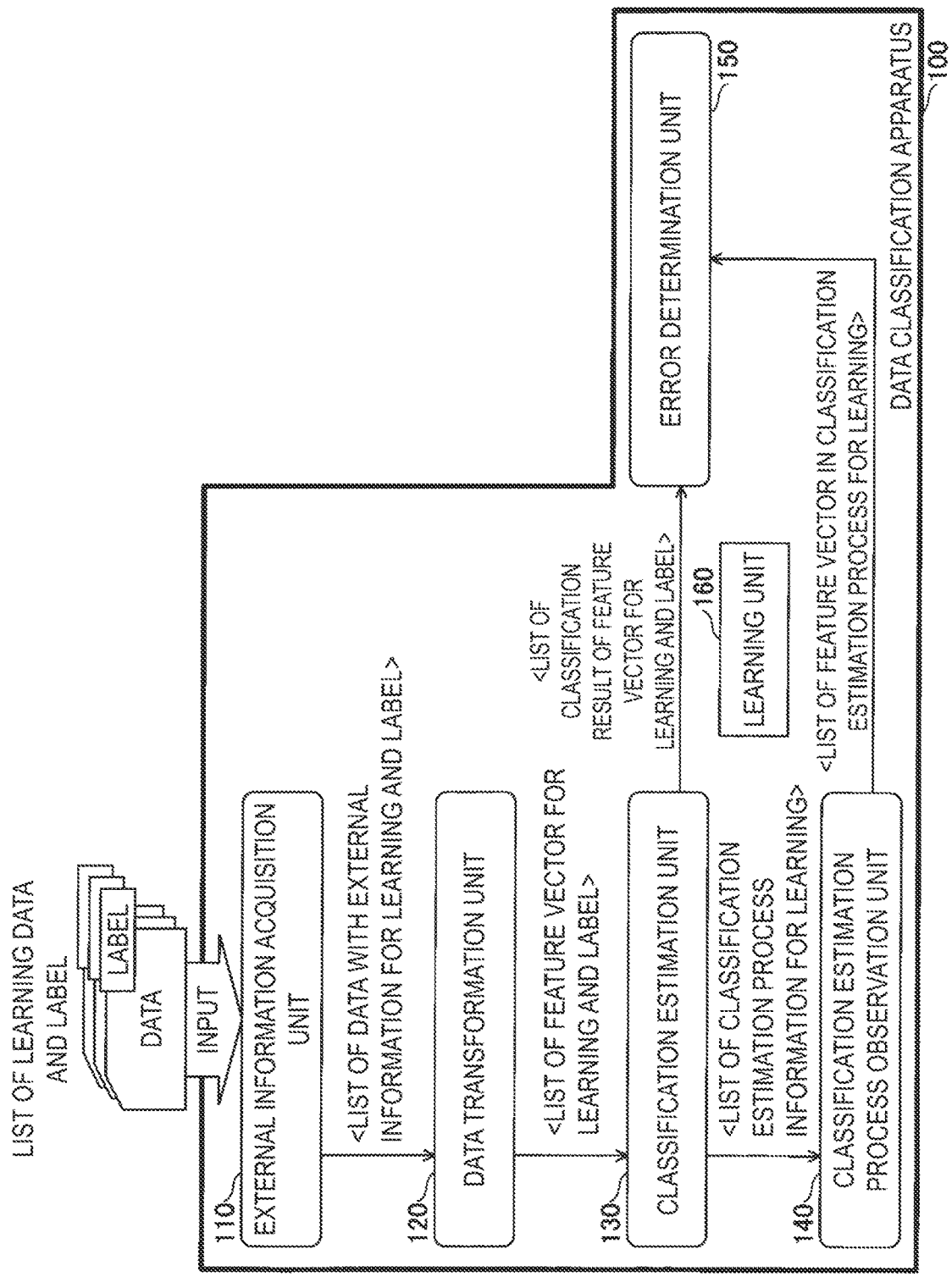
FIG. 1 is a diagram illustrating a configuration of a data classification apparatus in a learning phase.

FIG. 1 illustrates the functional configuration of the data classification apparatus 100 in the learning phase. FIG. 1 illustrates information input to each functional unit and also information output from each functional unit.

As illustrated in FIG. 1, the data classification apparatus 100 includes an external information acquisition unit 110, a data transformation unit 120, the classification estimation unit 130, a classification estimation process observation unit 140, and the error determination unit 150. Note that a learning unit 160 configured to perform processing related to learning of the classification estimation unit 130 and the error determination unit 150 may be provided. Each of the classification estimation unit 130 and the error determination unit 150 includes a learning function, and thus the learning unit 160 may not be provided.

The outline of functions of each functional unit is as follows. The outline of functions described below is common to the learning phase and the classification phase.

The external information acquisition unit 110 is a functional unit configured to refer to information in input data, and automatically acquire external information corresponding to the information on the Internet and the like.

The data transformation unit 120 is a functional unit configured to transform data and external information thereof into a feature vector. As an example, when the data is a signature, a feature vector can be generated by combining Onehot encoding with term frequency-inverse document frequency (TF-IDF).

The classification estimation unit 130 is a functional unit configured to estimate classification of data by ensemble learning. A model for estimating classification is not limited to a particular model, but a model of support vector machine (SVM) and a model of a neural network, for example, can be used. The classification estimation unit 130 is formed of a classifier by ensemble learning using a plurality of the models. By using a learning data set, an internal parameter of the classification estimation unit 130 is adjusted by machine learning.

The classification estimation process observation unit 140 is a functional unit configured to observe a calculation process in estimating classification of classification target data by the classification estimation unit 130 and create a feature vector based on an observation result.

The error determination unit 150 receives the classification result from the classification estimation unit 130, also receives observation data (specifically, the feature vector) in the classification estimation process from the classification estimation process observation unit 140, determines whether the classification estimated by the classification estimation unit 130 is "correct" or "incorrect" based on the observation data, and outputs the classification result and the error determination result. An internal parameter of the error determination unit 150 is adjusted by machine learning.

Referring to FIG. 1, an outline of the overall processing in the data classification apparatus 100 in the learning phase will be described.

A list of learning data and labels (a list having a plurality of sets of learning data and labels) is input to the external information acquisition unit 110. The list of learning data and labels is a list in which data and labels for performing machine learning are associated with each other. The label represents correct classification of the data, and a correspondence relationship between the data and the label is always associated in the data classification apparatus 100 during processing.

The external information acquisition unit 110 to which the list of learning data and labels is input extracts, for each piece of the data in the list, a reference destination of external information described in the data, acquires external information corresponding to the reference destination, and provides the acquired external information to the data.

The external information acquisition unit 110 transmits, to the data transformation unit 120, <list of data with external information for learning and label> being the list of learning data in which the external information is provided to each piece of the data, and labels.

The data transformation unit 120 performs processing described later on <list of data with external information for learning and label> received from the external information acquisition unit 110 and generates <list of feature vector for learning and label>. The data transformation unit 120 transmits <list of feature vector for learning and label> to the classification estimation unit 130.

The classification estimation unit 130 in the learning phase inputs a feature vector for learning for each set of the "feature vector for learning and the label" in <list of feature vector for learning and label> and compares an output classification result with a correct label, and thus performs a parameter adjustment by machine learning so as to reduce an error.

After the parameter adjustment, the classification estimation unit 130 transmits, to the classification estimation process observation unit 140, <list of classification estimation process information for learning> being acquired by inputting the list of feature vectors for learning. Further, the classification estimation unit 130 transmits <list of classification result of learning feature vector and label> to the error determination unit 150.

The classification estimation process observation unit 140 acquires, from a weak classifier, a predicted score for each class (for each classification) as a numerical vector, combines all numerical vectors acquired from each weak classifier, and sets the combined numerical vectors as a feature vector in a classification estimation process. In the learning phase, this is acquired as <list of feature vector in classification estimation process for learning>. The classification estimation process observation unit 140 transmits <list of feature vector in classification estimation process for learning> to the error determination unit 150.

The error determination unit 150 performs the parameter adjustment by the machine learning by using <list of classification result of learning feature vector and label> received from the classification estimation unit 130 and <list of feature vector in classification estimation process for learning> received from the classification estimation process observation unit 140. Details of a learning method will be described later.

Configuration in Classification Phase

Figure 2:
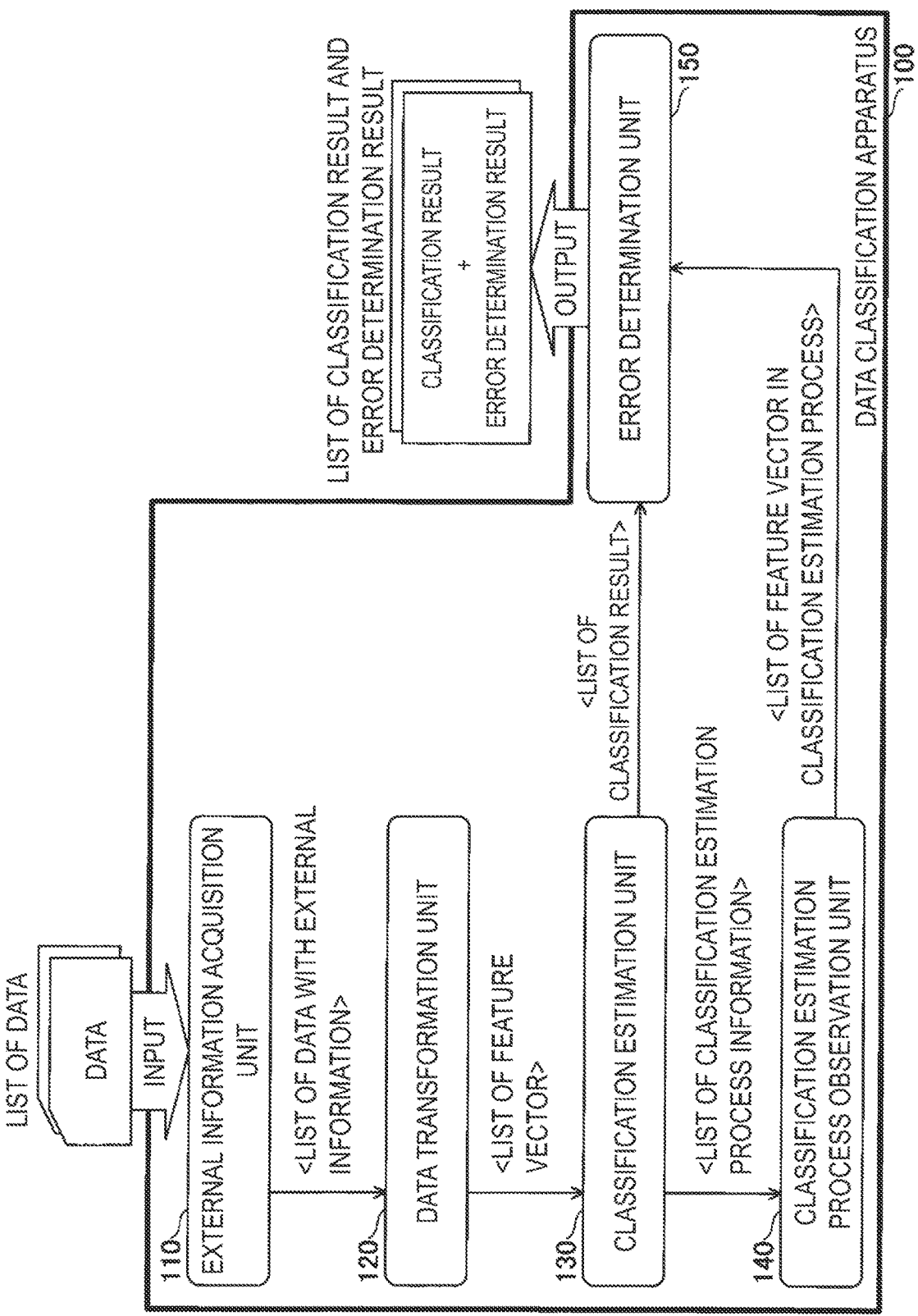
FIG. 2 is a diagram illustrating a configuration of the data classification apparatus in a classification phase.

FIG. 2 illustrates the functional configuration of the data classification apparatus 100 in the classification phase. As illustrated in FIG. 2, the functional configuration is similar to that in FIG. 1, but information to be processed is different from the information processed in FIG. 1.

With reference to FIG. 2, an outline of the overall processing of the data classification apparatus 100 in the classification phase will be described.

A list of data to be classified is input to the external information acquisition unit 110. The list of data is a list of data to be automatically classified is performed by the data classification apparatus 100.

The external information acquisition unit 110 to which the list of data is input automatically acquires, for each piece of the data in the list, external information described in the data from a reference destination of the external information, and provides the acquired external information to the data.

The external information acquisition unit 110 transmits, to the data transformation unit 120, <list of data with external information> in which the external information is provided to each piece of the data.

The data transformation unit 120 performs processing described later on <list of data with external information> received from the external information acquisition unit 110, generates <list of feature vector>, and transmits <list of feature vector> to the classification estimation unit 130.

The classification estimation unit 130 inputs each feature vector in <list of feature vector>, and outputs a classification result for each feature vector as <list of classification result>. Further, the classification estimation unit 130 transmits, to the classification estimation process observation unit 140, <list of classification estimation process information> acquired in a process of classification processing. Further, the classification estimation unit 130 transmits, to the error determination unit 150, <list of classification result> acquired from results of the classification.

The classification estimation process observation unit 140 acquires, from each weak classifier, a predicted score for each class (for each classification) as a numerical vector, and combines all acquired numerical vectors to acquire a feature vector in the classification estimation process. In the classification phase, this is acquired as <list of feature vector in classification estimation process>. The classification estimation process observation unit 140 transmits <list of feature vector in classification estimation process> to the error determination unit 150.

The error determination unit 150 performs an error determination by using <list of classification result> received from the classification estimation unit 130 and <list of feature vector in classification estimation process> received from the classification estimation process observation unit 140, and outputs a list of classification results and error determination results. The "list of classification results and error determination results" is a list of classification results of data in a "list of data" as an input and error determination results for classification determination results of the data. The "list of classification results and error determination results" is output in a state associated with each piece of the data in the "list of data".

Example of Hardware Configuration

The data classification apparatus 100 can be implemented by causing a computer to execute a program describing details of processing as described in the embodiment, for example. Further, the "computer" may be a physical machine or a virtual machine on cloud. When a virtual machine is used, "hardware" mentioned here is virtual hardware.

The program can be recorded on a computer-readable recording medium (a portable memory or the like) to be stored or distributed. The program can also be provided via a network such as the Internet or an e-mail.

Figure 3:
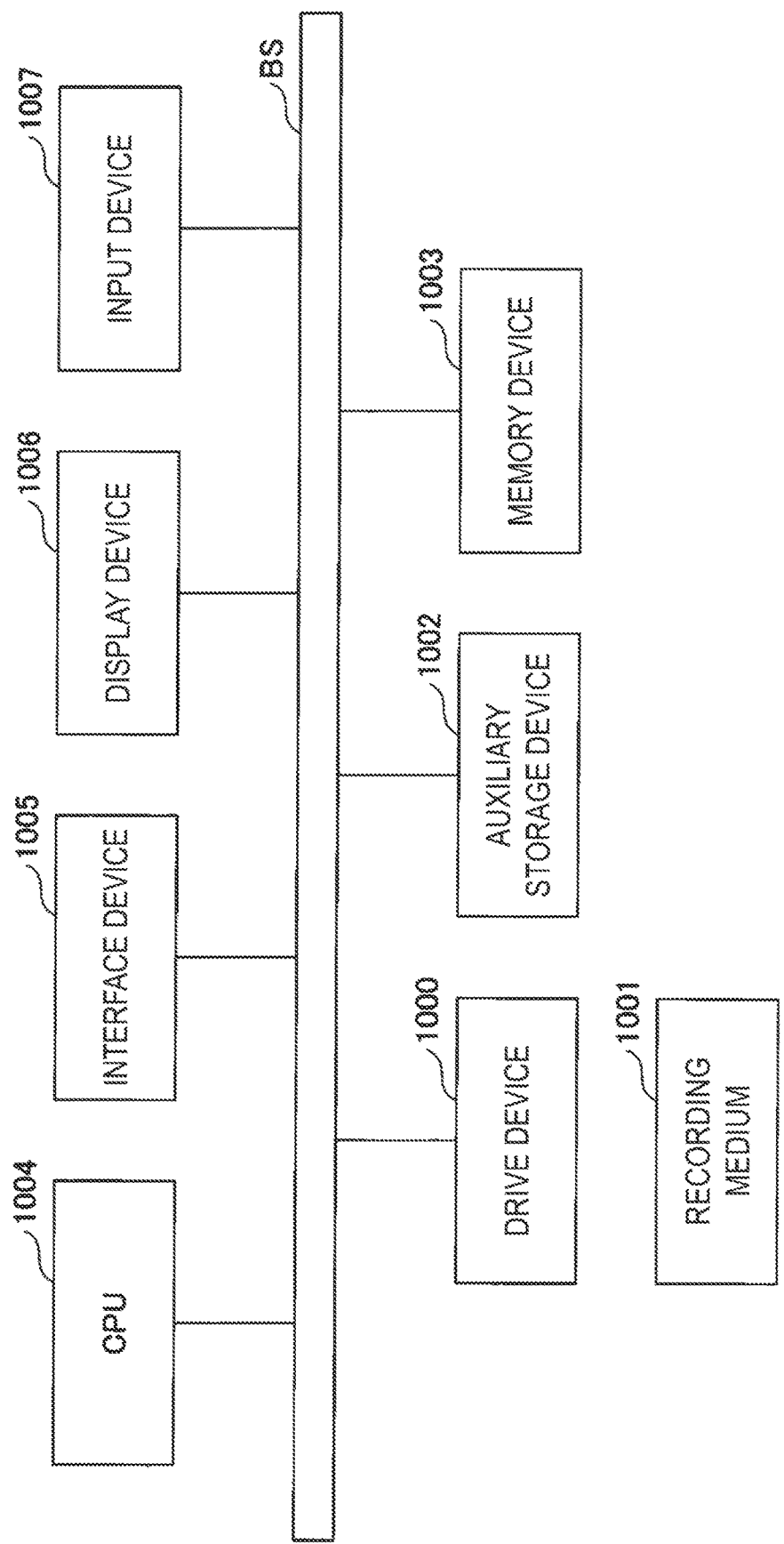
FIG. 3 is a diagram illustrating an example of a hardware configuration of devices.

FIG. 3 is a diagram illustrating an example of a hardware configuration of the above-described computer. The computer in FIG. 3 includes a drive device 1000, an auxiliary storage device 1002, a memory device 1003, a CPU 1004, an interface device 1005, a display device 1006, an input device 1007, and the like which are connected to each other through a bus BS.

A program for realizing processing in the computer is provided by, for example, a recording medium 1001 such as a CD-ROM or a memory card. When the recording medium 1001 storing the program is set in the drive device 1000, the program is installed in the auxiliary storage device 1002 from the recording medium 1001 via the drive device 1000. Here, the program may not necessarily be installed from the recording medium 1001 and may be downloaded from another computer via a network. The auxiliary storage device 1002 stores the installed program and also stores necessary files, data, and the like.

The memory device 1003 reads the program from the auxiliary storage device 1002 and stores the program when an instruction to activate the program is given. The CPU 1004 achieves functions related to the apparatus in accordance with the program stored in the memory device 1003. The interface device 1005 is used as an interface for connection to a network. The display device 1006 displays a graphical user interface (GUI) or the like according to a program. The input device 1007 is constituted by a keyboard, a mouse, buttons, a touch panel, and the like, and is used to input various operation instructions.

Example

The operation of the data classification apparatus 100 will be described below in more detail. In the present example, an example on the assumption that a signature is used as data to be classified (used for learning) will be described.

First, the signature will be described. As described above, the signature is a pattern file in which a pattern of malignant communication used for the IPS/IDS is described. Although a method for describing a signature for each vendor of the IPS/IDS varies, one signature may include any of the following information in the present embodiment.

5-tuple (a protocol, a source address, a source port, a destination address, and a destination port).

Message: information displayed to a user of the IDS/IPS when a signature matches a pattern.

Content: a pattern of communication itself. Formed of a binary or a character string.

When there is communication that matches a content, it is determined that the content corresponds to the signature. There may be a plurality of contents for one signature.

Reference destination: a URL or common vulnerabilities and exposures (CVE) number of a WEB page in which relevant information of a signature thereof is described. There may be a plurality of contents for one signature.

FIG. 4 illustrates, as a specific example of a signature, an example of a signature of an IDS/IPS engine of OSS called SNOTE (https://snort.org/).

In the example in FIG. 4, a protocol, a source address, a source port, a destination address, and a destination port of the "5-tuple" correspond to positions of tcp, $EXTERNAL NET, any, $HTTP SERVERS, and $HTTP PORTS, respectively.

In the example in FIG. 4, the "message" corresponds to a character string in double quotation marks of "WEB-PHP admin.php file upload attempt".

In the example in FIG. 4, the "content" corresponds to a character string in double quotation marks of "file name=". In the example in FIG. 4, the "reference destination" corresponds to a character string after a colon of reference: bugtraq, 3361.

Note that the signature of SNOTE illustrated in FIG. 4 is cited from the WEB page of "https://www.atmarkit.co.jp/ait/articles/0502/04/news120.html".

The data classification apparatus 100 can also perform classification on data other than a signature. For example, an image, a document, a sound, or the like can also be used as the data. When an image, a document, a sound, or the like is used as the data, a transformation procedure of the external information acquisition unit 110 and the data transformation unit 120 may be set to a transformation procedure corresponding to the data such as an image, a document, and a sound.

For example, in a case of an image, the data transformation unit 120 transforms the image into a feature vector formed of a histograms of oriented gradients (HOG) feature. Further, any of an image, a document, a sound, and the like may be transformed into a feature vector by deep learning.

Hereinafter, details of the processing in the learning phase and the classification phase when a signature is used as data will be described.

Example: Learning Phase

Details of the processing of the data classification apparatus 100 (FIG. 1) in the learning phase will be described along a procedure of the flowchart illustrated in FIG. 5.

First, as a prior operation before data input to the data classification apparatus 100, a user of the data classification apparatus 100 prepares signatures and provides a label to any number of the signatures. As described above, this label refers to behavior (such as logging, a notification, and a cutoff) of the IDS/IPS for communication matched to the signature. However, such a label is one example, and a label other than the behavior of the IDS/IPS can also be provided. A list of signatures provided with labels is a "list of learning data and labels".

S101: Input

Figure 5:
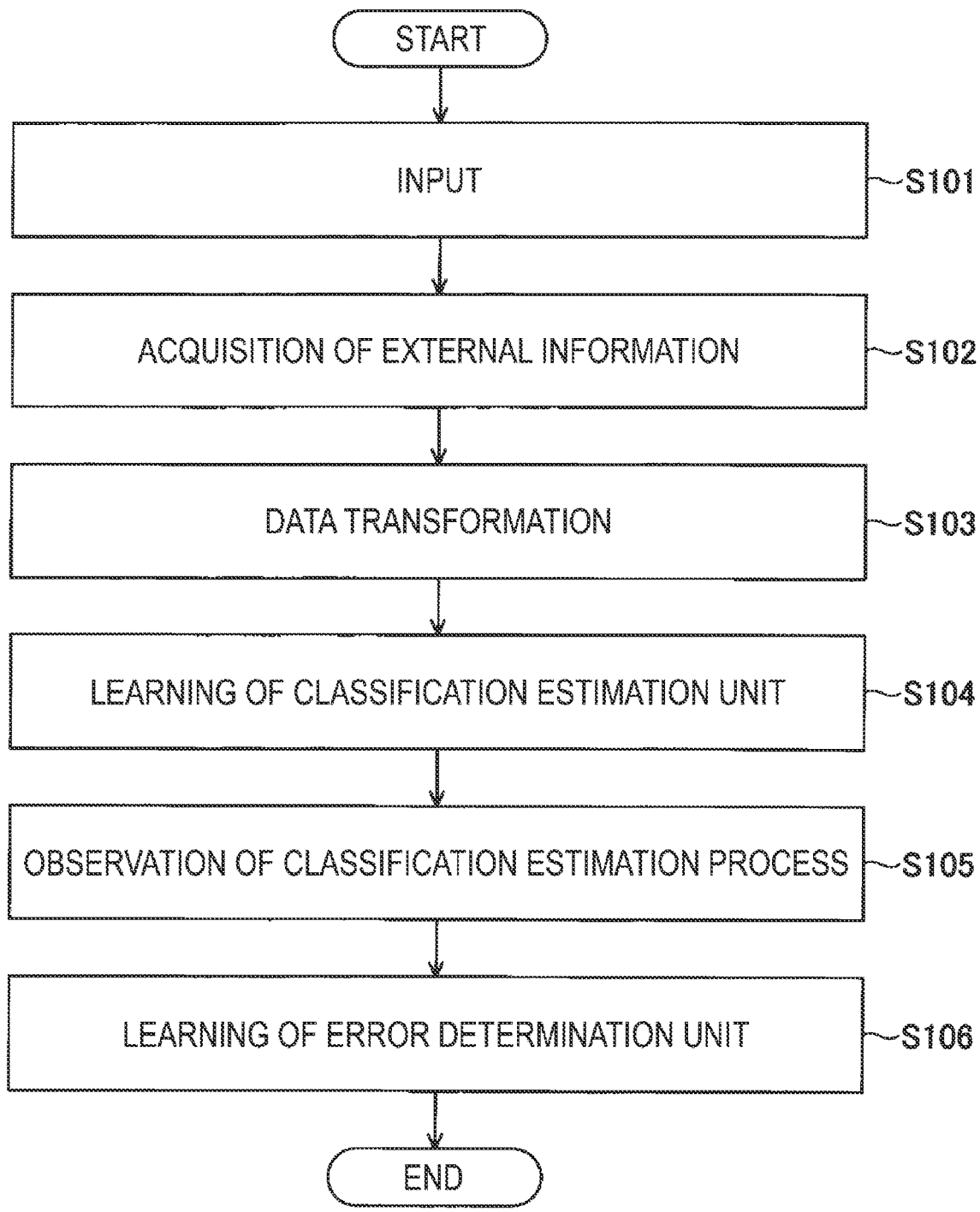
FIG. 5 is a flowchart illustrating a processing procedure in the learning phase.

In S101 in the flowchart in FIG. 5, a user inputs the "list of learning data and labels" to the external information acquisition unit 110 of the data classification apparatus 100.

S102: Acquisition of External Information

In S102, the external information acquisition unit 110 refers to information in the learning data for each piece of the learning data in the "list of learning data and labels", and automatically acquires corresponding external information on the Internet. Note that, in the present example, using external information is not necessary. A feature vector may be generated from only learning data (only classification target data in the classification phase) without using external information.

When a signature is used as data as in the present example, the external information acquisition unit 110 can acquire the external information by using, for example, a URL or CVE number of a reference destination (reference in a case of SNOTE). More specifically, the external information acquisition unit 110 extracts the URL or the like from the signature in a regular expression, uses software such as wget or curl, and thus designates the URL or the like to acquire external information.

The external information acquisition unit 110 creates <list of data with external information for learning and label> provided with the external information acquired for each piece of the learning data in the "list of learning data and labels" and transmits <list of data with external information for learning and label> to the data transformation unit 120.

S103: Data Transformation

The data transformation unit 120 transforms data into a feature vector. Examples of the processing in the present example using a signature as data are as follows.

The data transformation unit 120 transforms four pieces of information of 5-tuple, a message, a content, and a reference destination included in the signature into a feature vector for learning by the following procedure.

The data transformation unit 120 performs processing in S1 to S5 below on each signature with external information for learning in <list of data with external information for learning and label> received from the external information acquisition unit 110. Note that an order of the processing from S1 to S4 is optional.

S1: The data transformation unit 120 transforms each of a protocol, a source address, a source port, a destination address, and a destination port of the 5-tuple into a numerical vector by Onehot encoding.

S2: The data transformation unit 120 regards the message as a document and transforms the document into a numerical vector by TF-IDF.

S3: The data transformation unit 120 regards the content as a document and transforms the document into a numerical vector by TF-IDF. When there are a plurality of contents for one signature, the data transformation unit 120 combines the plurality of contents in advance, regards the plurality of contents as one document, and performs TF-IDF.

S4: The data transformation unit 120 regards, as a document, external information acquired by using the reference destination, and transforms the document into a numerical vector by TF-IDF. When there are a plurality of reference destinations for one signature, the data transformation unit 120 combines in advance a plurality of pieces of external information acquired from the plurality of reference destinations, regards the plurality of pieces of external information as one document, and transforms the document into a numerical vector by TF-IDF.

S5: The data transformation unit 120 couples the numerical vector acquired in S1, the numerical vector acquired in S2, the numerical vector acquired in S3, and the numerical vector acquired in S4 to acquire a feature vector for learning. The coupling processing is performed for each signature.

For example, for a certain signature, provided that the numerical vector acquired in S1 is V1, the numerical vector acquired in S2 is V2, the numerical vector acquired in S3 is V3, and the numerical vector acquired in S4 is V4, [V1 V2 V3 V4] is acquired as a feature vector for learning.

Onehot encoding and TF-IDF themselves are existing techniques. Onehot encoding is encoding that transforms information to be encoded into a vector such that one component is 1 and remaining components are all 0. TF-IDF is one of techniques for evaluating importance of a word included in a document.

Note that performing all of S1 to S5 described above is one example. For example, the processing of any one of S1 to S4 may be performed, and S5 may not be performed. Further, the processing of any two of S1 to S4 may be performed, and two numerical vectors may be coupled in S5. Further, the processing of any three of S1 to S4 may be performed, and three numerical vectors may be coupled in S5.

The data transformation unit 120 creates <list of data with external information for learning and label> being a list of sets of feature vectors for learning and corresponding labels and transmits the <list of data with external information for learning and label> to the classification estimation unit 130.

As described above, the technique according to the present example can transform a signature formed of a character string into a numerical vector.

S104: Learning of Classification Estimation Unit 130

In S104, learning of the classification estimation unit 130 is performed. The classification estimation unit 130 includes a plurality of classifiers (referred to as weak classifiers) and estimates classification of data by ensemble learning. Ensemble learning is a technique for increasing classification performance by causing a plurality of weak classifiers to learn and integrating classification results of the plurality of learned weak classifiers.

There are a plurality of techniques such as bagging and boosting in ensemble learning, but in the present example, any technique may be applied as long as the classification estimation unit 130 is formed of a plurality of weak classifiers. The simplest example of ensemble learning is a majority decision (bagging) by a plurality of weak classifiers. Each weak classifier is a classifier having low distinguishing abilities, which is learned with a small sample acquired by sampling without replacement from a learning sample. However, by creating a plurality of classifiers and performing a majority decision, the whole can function as one classifier and high performance can be acquired.

In S104, learning (supervised learning) of the classification estimation unit 130 is performed by using <list of feature vector for learning and label> output from the data transformation unit 120, and an internal parameter in the classification estimation unit 130 is adjusted.

More specifically, for example, a feature vector for learning in <list of feature vector for learning and label> is input to each weak classifier, the output from the weak classifier is compared with a correct label (label corresponding to a feature vector for learning), and an internal parameter is adjusted so as to reduce an error. Such learning processing may be performed by the classification estimation unit 130 itself or may be performed by the learning unit 160 by providing the learning unit 160 outside the classification estimation unit 130.

After learning of the classification estimation unit 130 (after the internal parameter adjustment), the classification estimation unit 130 performs processing of estimating classification for each learning feature vector in <list of feature vector for learning and label> and acquires <list of classification estimation process information for learning> and <list of classification result of learning feature vector and label>.

The classification estimation unit 130 transmits <list of classification estimation process information for learning> to the classification estimation process observation unit 140 and transmits <list of classification result of leaning feature vector and label> to the error determination unit 150. In the present example, the classification estimation process information for learning is a predicted score for each weak classifier.

S105: Observation of Classification Estimation Process

In S105, the classification estimation process observation unit 140 acquires all predicted scores output from the plurality of weak classifiers included in the classification estimation unit 130 and combines the predicted scores to create a feature vector.

The classification estimation process observation unit 140 performs the following procedures S1 and S2 for each piece of the classification estimation process information in <list of classification estimation process information for learning> to create a feature vector in the classification estimation process.

S1: The classification estimation process observation unit 140 acquires, as a numerical vector, a predicted score for each class (classification) from each weak classifier.

S2: The classification estimation process observation unit 140 acquires, as a feature vector, a vector acquired by combining all of the acquired numerical vectors.

Figure 6:
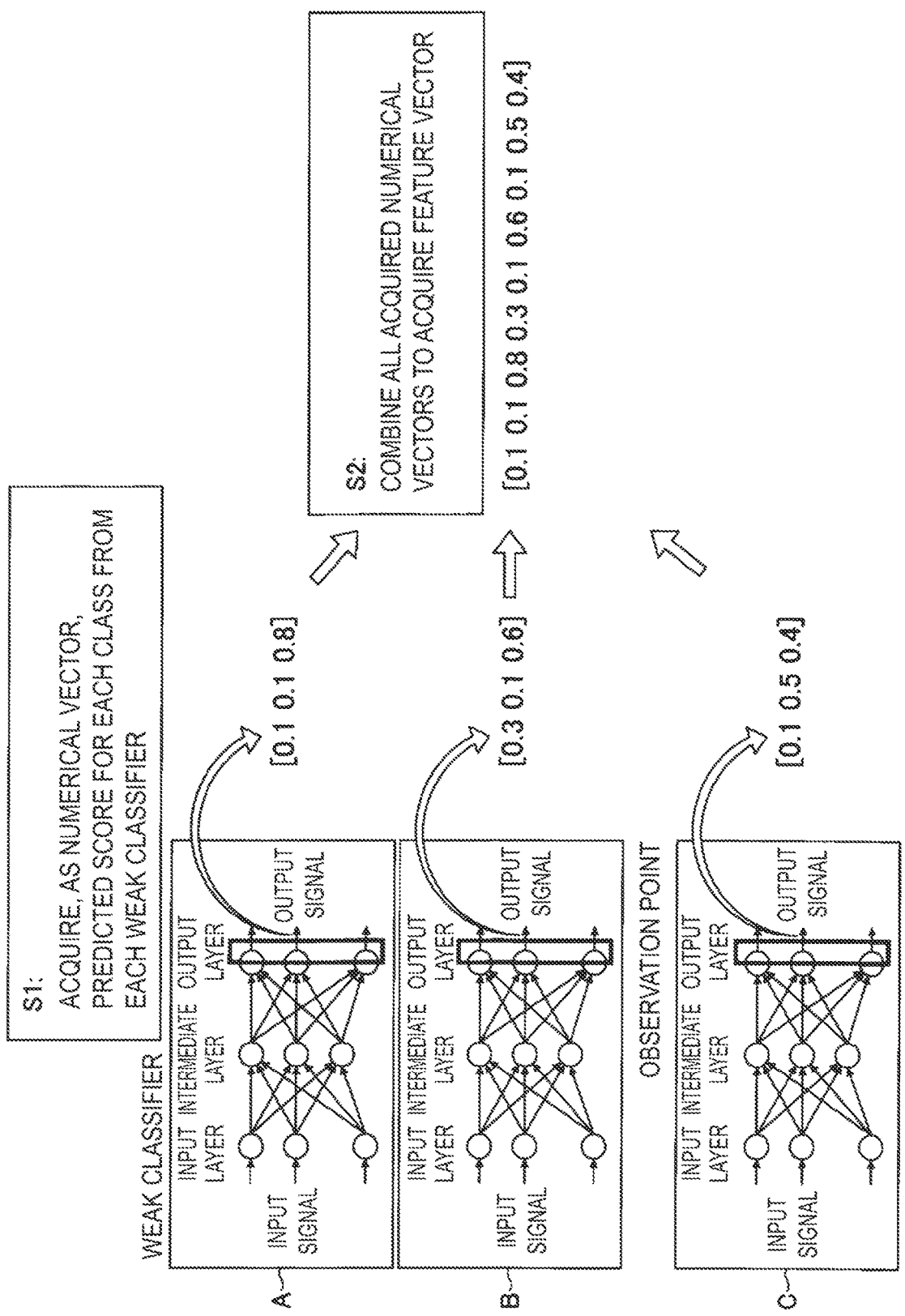
FIG. 6 is a diagram for explaining a method for creating a feature vector in a classification estimation process.

A creation image of a feature vector when a neural network is used as a weak classifier constituting the classification estimation unit 130 is illustrated in FIG. 6.

In the example illustrated in FIG. 6, the classification estimation unit 130 includes three weak classifiers A to C, and an output layer of each of the weak classifiers is an observation point. The output (three numerical vectors) from the weak classifiers A to C illustrated in FIG. 6 corresponds to one piece of classification estimation process information. As illustrated in FIG. 6, the three numerical vectors are combined to acquire a feature vector.

The classification estimation process observation unit 140 sets, in <list of feature vector in classification estimation process for learning>, a feature vector for each piece of classification estimation process information in <list of classification estimation process information for learning> and transmits the <list of feature vector in classification estimation process for learning> to the error determination unit 150.

Note that FIG. 6 illustrates the case where three weak classifiers are used, but the case where weak classifiers are three is merely an example. The processing in the present example can be performed in any number of a plurality of weak classifiers.

Further, the weak classifier constituting the classification estimation unit 130 is not limited to a neural network and can be implemented by any model (for example: SVM, a decision tree, and the like) that can calculate a predicted score of each classification.

Figure 7:
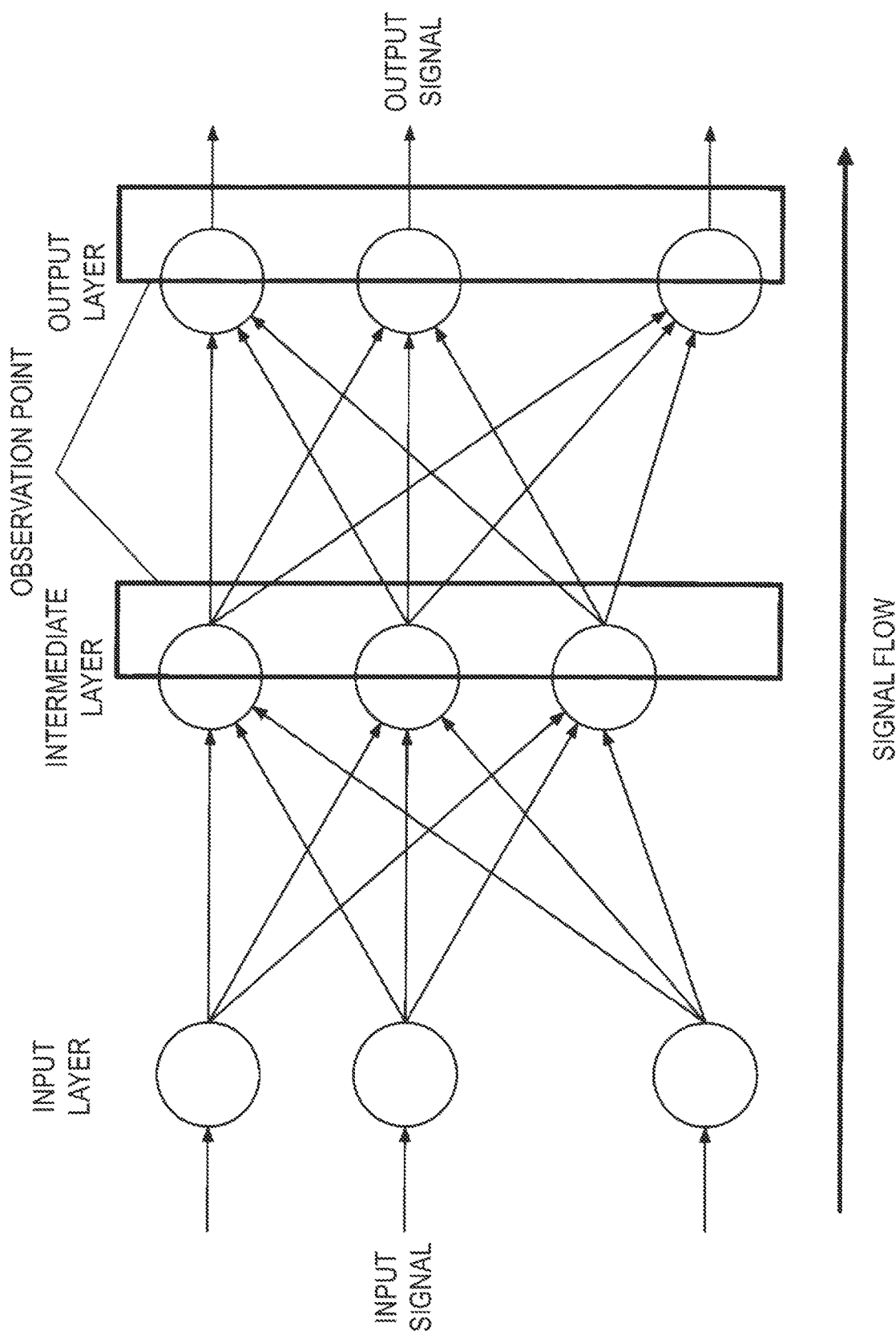
FIG. 7 is a diagram for explaining an example when an intermediate layer and an output layer are observed.

When a neural network is used as a weak classifier, the classification estimation process observation unit 140 may also simultaneously acquire a value output from each node of one or more intermediate layers in addition to a value output from each node (activation function) of an output layer and set the combined values as a numerical vector per weak classifier. FIG. 7 illustrates an example of a weak classifier when an output layer and an intermediate layer are used as observation points. FIG. 7 illustrates one of a plurality of weak classifiers.

In the example illustrated in FIG. 7, for example, when values of the nodes in the intermediate layer are 0.5, 0.4, 0.7 and values of the nodes in the output layer are 0.2, 0.7, 0.1, the numerical vector of the weak classifier may be configured as [0.5 0.4 0.7 0.2 0.7 0.1].

Figure 8:
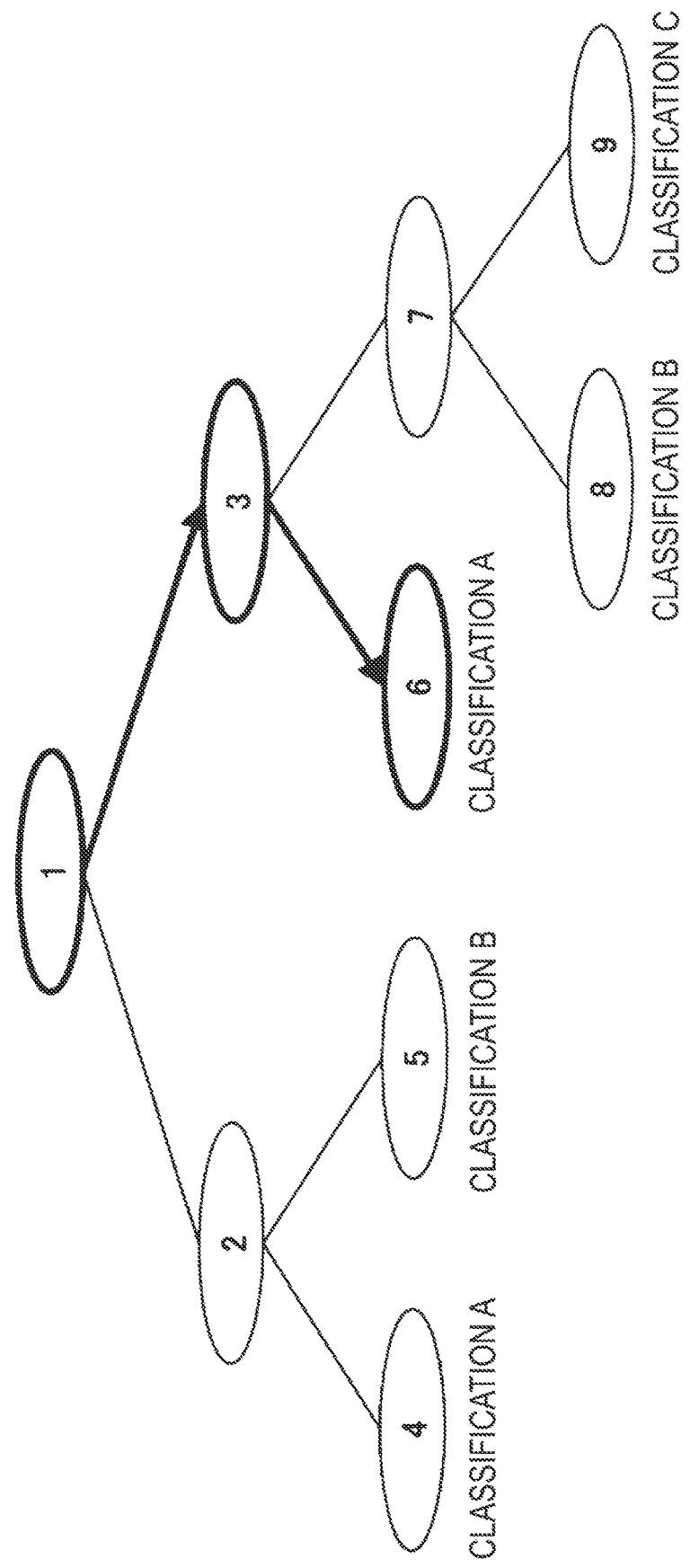
FIG. 8 is a diagram for explaining an example when a decision tree is used.

FIG. 8 illustrates an example of a weak classifier when a decision tree is used as the weak classifier. FIG. 8 illustrates one of a plurality of weak classifiers. In the weak classifier, a route in which classification is determined is observed, and a numerical vector is configured. The example in FIG. 8 is a decision tree that estimates any of three classifications: classification A, classification B, and classification C.

In the example illustrated in FIG. 8, when classification A is reached in a route of node 1→node 3→node 6, the classification estimation process observation unit 140 acquiring the observation data generates a numerical vector [1 0 1 0 0 1 00 0]. In this example, the index of the vector element corresponds to the node number of the decision tree. The numerical vector is configured such that when the route passes through a node, 1 enters the element corresponding to the node, and when the route does not pass through the node, 0 enters the element corresponding to the node.

S106: Learning of the Error Determination Unit 150

In order to describe what kind of functional unit the error determination unit 150 is, first, an operation outline in the classification phase will be described.

The error determination unit 150 in the classification phase receives a list of classification results from the classification estimation unit 130, also receives a list of feature vectors in the classification estimation process from the classification estimation process observation unit 140, and determines whether the classification estimated by the classification estimation unit 130 is "correct" or "incorrect" based on the feature vectors in the classification estimation process. In a case of "correct", the error determination unit 150 uses the classification estimated by the classification estimation unit 150 as the classification result, and in a case of "incorrect", the error determination unit 150 uses "unknown" as the classification result.

The error determination unit 150 configured to perform the operation described above can be configured of a model often used in the machine learning field, for example. The error determination unit 150 can be configured of the SVM, the neural network, or the like, for example. In using these models, the error determination unit 150 may be implemented by parameter-tuning the models by supervised learning.

In the learning of the error determination unit 150 in S106, the error determination unit 150 receives <list of feature vector in classification estimation process for learning> from the classification estimation process observation unit 140, and, when receiving <list of classification result of learning feature vector and label> from the classification estimation unit 130, the error determination unit 150 performs learning (adjustment of an internal parameter) in a procedure of S1 to S5 below. Note that learning processing described below may be performed by the error determination unit 150 itself or may be performed by the learning unit 160 by providing the learning unit 160 outside the error determination unit 150. Hereinafter, the error determination unit 150 will be described as performing the learning processing.

S1: The error determination unit 150 compares a classification result and a label in <list of classification result of learning feature vector and label> and generates a correct/incorrect list.

S2: The error determination unit 150 generates only any number of pseudo feature vectors by a random number and the like.

S3: The error determination unit 150 combines <list of feature vector in classification estimation process for learning> and a list of pseudo feature vectors to generate a learning feature vector list.

S4: The error determination unit 150 adds, to the correct/incorrect list, the same number of elements of numerical values indicating errors as the number of pseudo feature vectors being generated.

S5: The error determination unit 150 performs machine learning with the correct/incorrect list as an output (correct) and a list of learning feature vectors as an input and adjusts a parameter of the error determination unit 150.

Specific examples of the above-described processing will be described with reference to FIGS. 9 to 11.

S1

Figure 9:
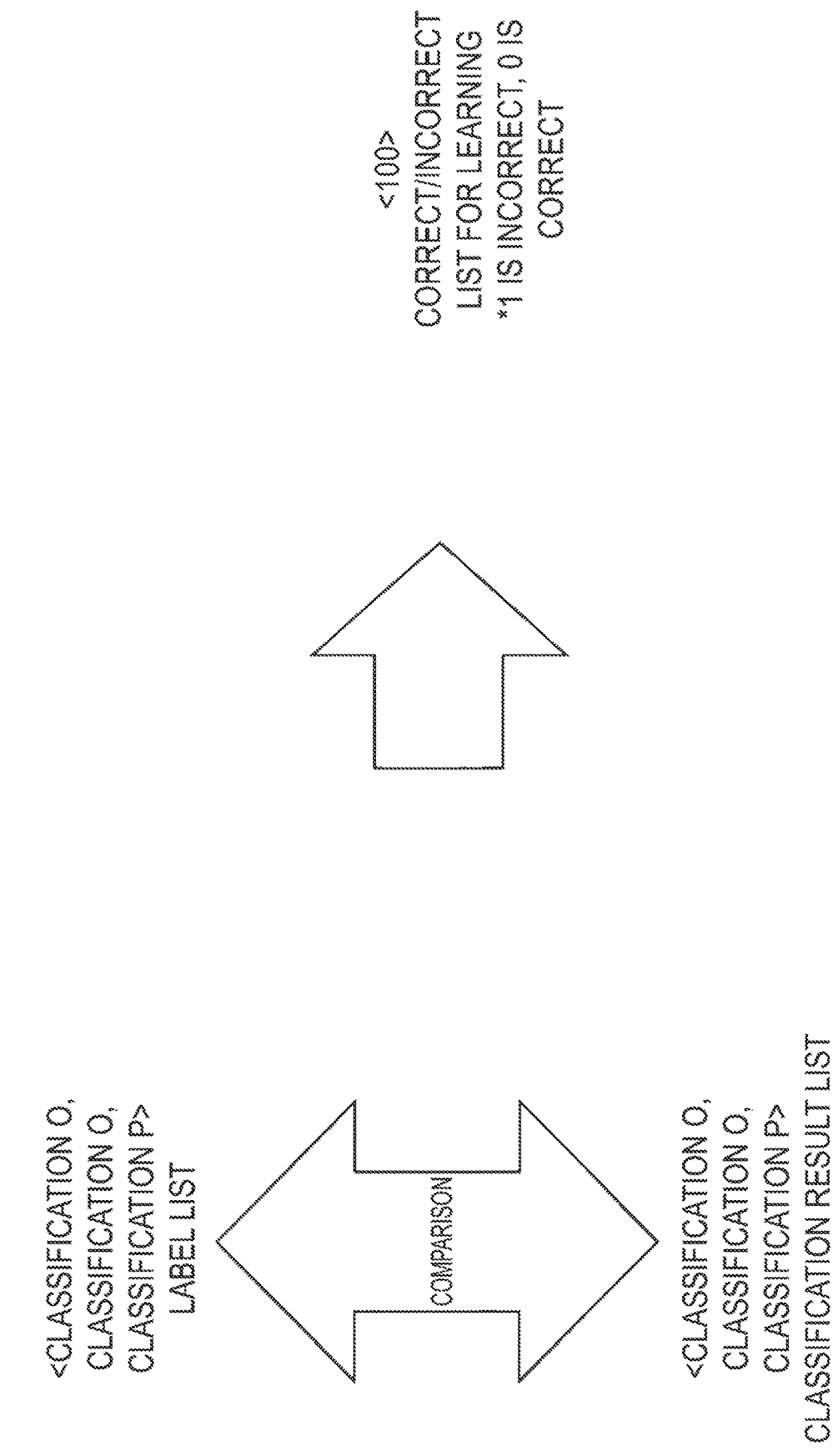
FIG. 9 is a diagram for explaining learning of an error determination unit.

In the example illustrated in FIG. 9, a list of classification results in <list of classification result of learning feature vector and label> is <classification P, classification O, classification P>. Further, a list of labels (correct classification) is <classification O, classification O, classification P>. In comparison between them, the correct classification of the first classification is classification O, while the first classification is classification P in the classification result. Thus, the first classification is incorrect, and the first element of the correct/incorrect list for learning becomes 1 (incorrect). Because the second and third classifications are correct, the correct/incorrect list becomes <0 0>.

S2, S3

Figure 10:
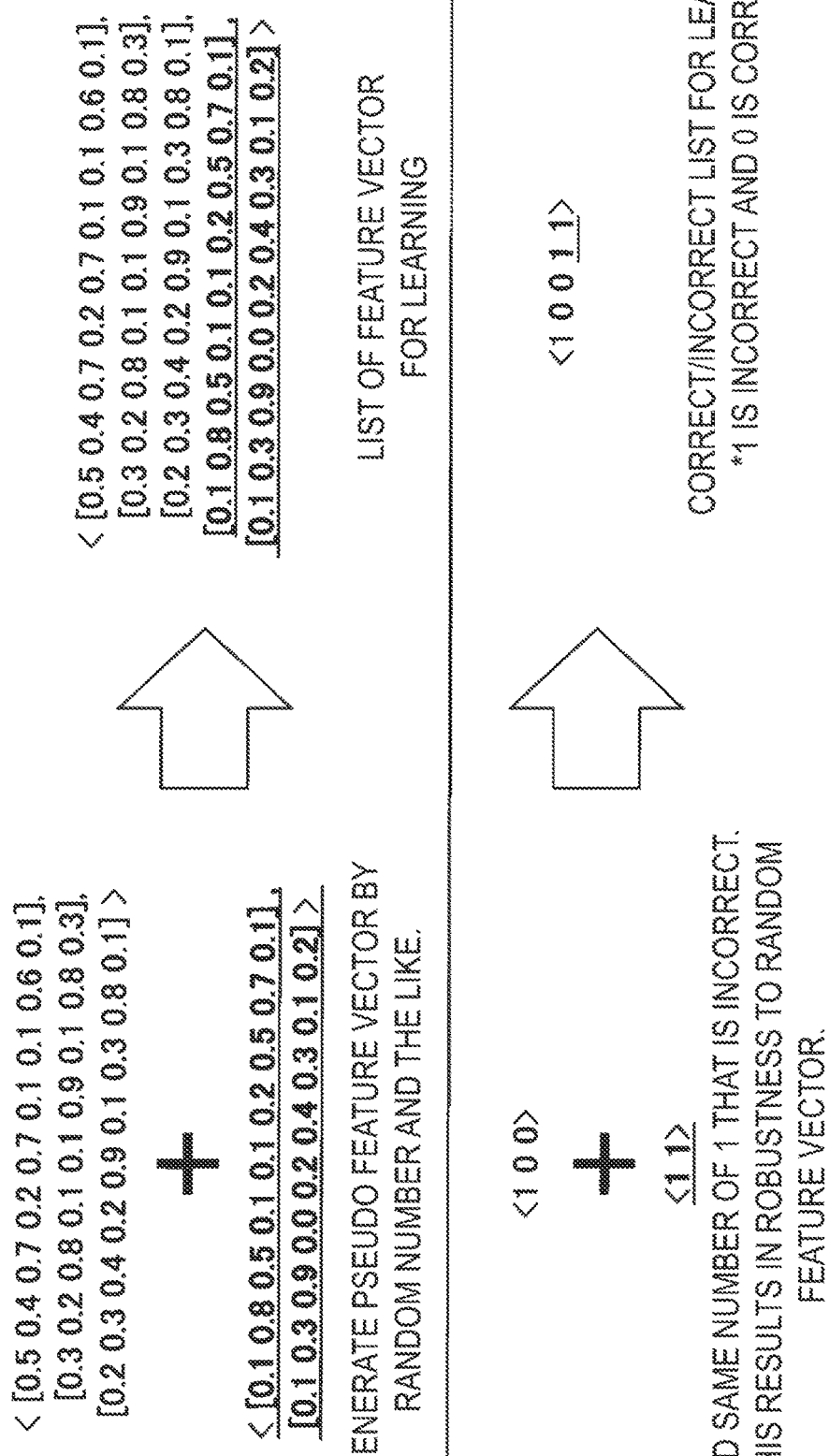
FIG. 10 is a diagram for explaining learning of the error determination unit.

In the example illustrated in FIG. 10, <list of feature vector in classification estimation process for learning> is <[0.5 0.4 0.7 0.2 0.7 0.1 0.1 0.6 0.1], [0.3 0.2 0.8 0.1 0.1 0.9 0.1 0.8 0.3], [0.2 0.3 0.4 0.2 0.9 0.1 0.3 0.8 0.1]>.

In S2, in the example illustrated in FIG. 10, the error determination unit 150 generates two pseudo-feature vectors by a random number and the like. In other words, as pseudo feature vectors, <[0.1 0.8 0.5 0.1 0.1 0.2 0.5 0.7 0.1], [0.1 0.3 0.9 0.0 0.2 0.4 0.3 0.1 0.2]> is generated.

In S3, as illustrated in FIG. 10, the error determination unit 150 combines <list of feature vector in classification estimation process for learning> and a list of pseudo feature vectors to generate a learning feature vector list.

S4

In S4, as illustrated in FIG. 10, the error determination unit 150 adds, to the correct/incorrect list <1 0 0>, the same number of elements of numerical values indicating errors as the number of (two) pseudo feature vectors being generated. In this way, <1 0 0 1 1> is acquired as a correct/incorrect list for learning. Such an addition results in robustness to a random feature vector and improves the accuracy of correct/incorrect determination with respect to data having unknown characteristics.

S5

Figure 11:
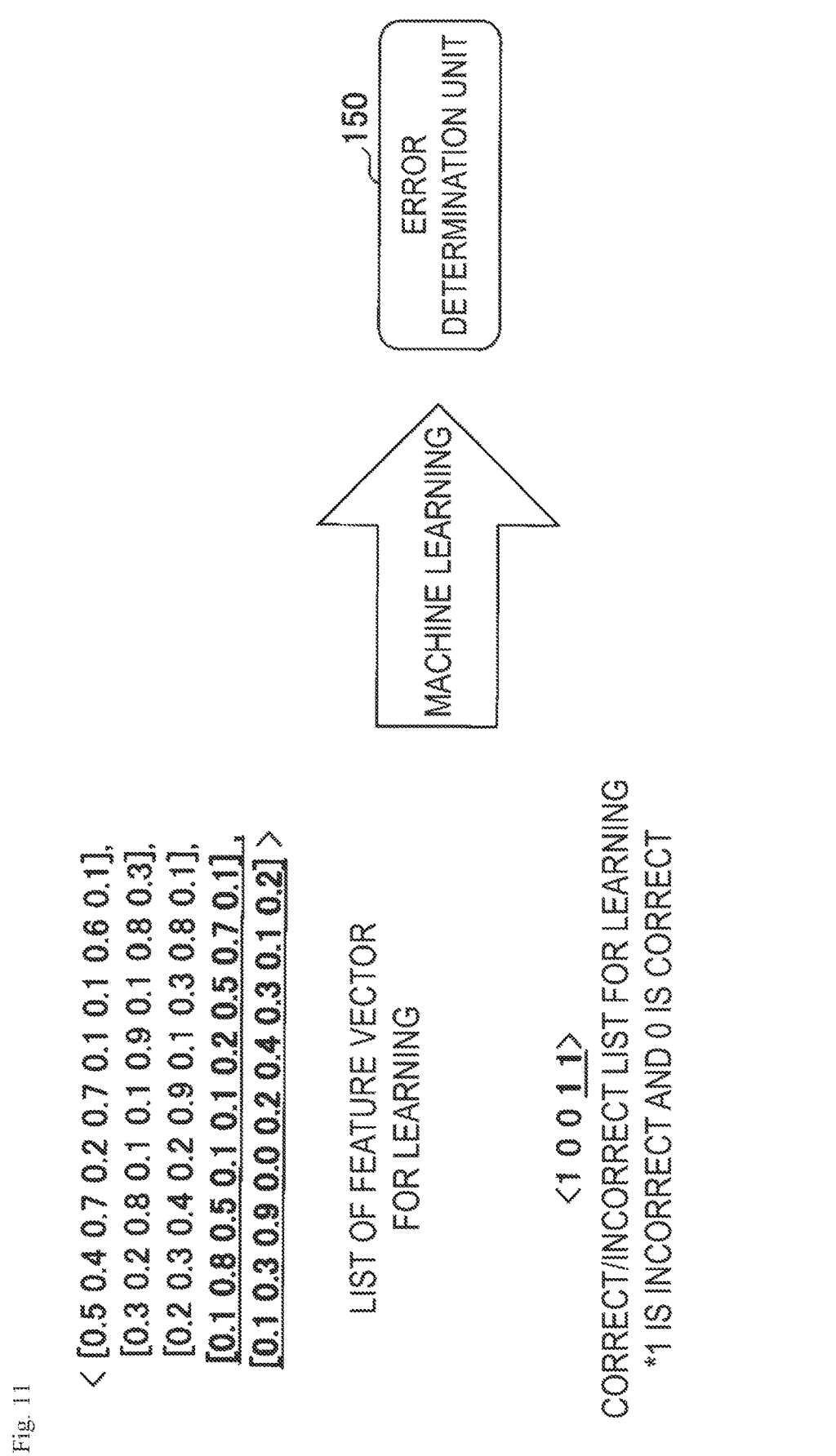
FIG. 11 is a diagram for explaining learning of the error determination unit.

In S5 illustrated in FIG. 11, the internal parameter of the error determination unit 150 is adjusted so as to reduce an error by comparing an output from the error determination unit 150 with the correct/incorrect list for learning (correct) while the learning feature vector list is set as an input of the error determination unit 150.

Example: Classification Phase

Next, details of the processing of the data classification apparatus 100 (FIG. 2) in the classification phase will be described along a procedure of the flowchart illustrated in FIG. 12. In the classification phase, in the data classification apparatus 100, the classification estimation unit 130 and the error determination unit 150 are already learned.

Note that processing in S202 (acquisition of external information), processing in S203 (data transformation), and processing in S205 (observation of classification estimation process) in the classification phase are the same as the processing in S102 (acquisition of external information), the processing in S103 (data transformation), the processing in S105 (observation of classification estimation process) in the learning phase, respectively, except that processing targets are different (difference between a target for learning or a target for classification). Thus, S202, S203, and S205 below are briefly described.

S201: Input

Figure 12:
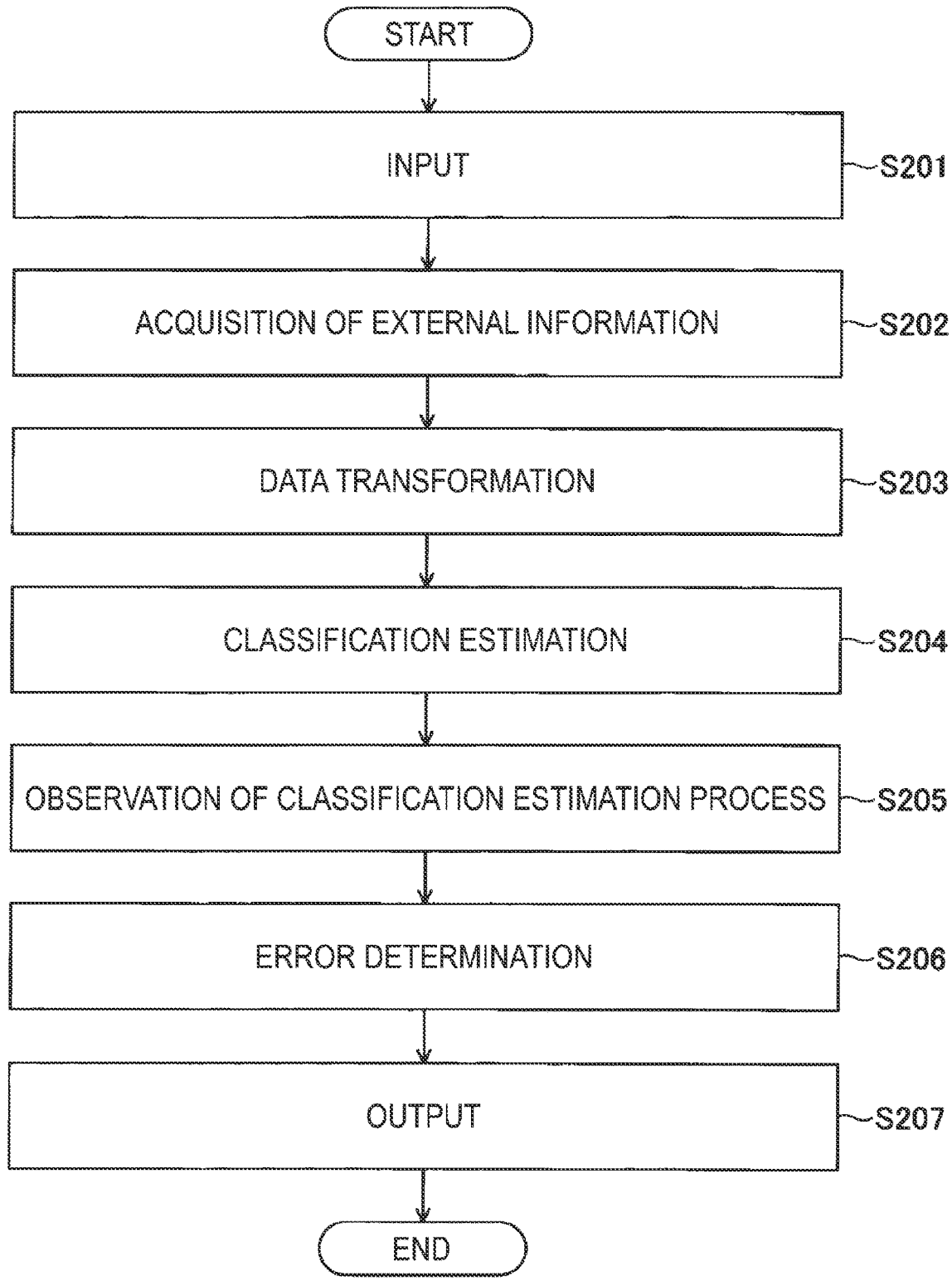
FIG. 12 is a flowchart illustrating a processing procedure in the classification phase.

In S201 in the flowchart in FIG. 12, a user inputs a list of data to be classified to the external information acquisition unit 110 of the data classification apparatus 100.

S202: Acquisition of External Information

In S202, similarly to S102 in the learning phase, the external information acquisition unit 110 refers to information in data for each piece of data in the "list of data", and automatically acquires corresponding external information on the Internet. The external information acquisition unit 110 transmits <list of data with external information> to the data transformation unit 120.

S203: Data Transformation

The data transformation unit 120 receives <list of data with external information> from the external information acquisition unit 110 and transforms each piece of the data included in the list into a feature vector to acquire <list of feature vector> similarly to S103 in the learning phase. The data transformation unit 120 transmits <list of feature vector> to the classification estimation unit 130.

S204: Classification Estimation

In S204, the classification estimation unit 130 receives <list of feature vector> from the data transformation unit 120 and performs processing of estimating classification of each feature vector in the list to acquire <list of classification estimation process information> and <list of classification result>. Examples of classification estimation process information are as described in the learning phase.

The classification estimation unit 130 transmits <list of classification estimation process information> to the classification estimation process observation unit 140 and transmits <list of classification result> to the error determination unit 150.

S205: Observation of Classification Estimation Process

In S205, the classification estimation process observation unit 140 receives <list of classification estimation process information> and generates a feature vector similarly to S105 in the learning phase to acquire <list of feature vector in classification estimation process>. The classification estimation process observation unit 140 transmits <list of feature vector in classification estimation process> to the error determination unit 150.

S206: Error Determination

The error determination unit 150 receives the list of classification results from the classification estimation unit 130, and also receives <list of feature vector in classification estimation process> from the classification estimation process observation unit 140. The error determination unit 150 determines whether the classification estimated by the classification estimation unit 130 is "correct" or "incorrect" based on a feature vector in the classification estimation process included in the list.

S207: Output

The error determination unit 150 outputs a list of sets of classification results and error determination results. When the error determination result is "correct", the classification estimated by the classification estimation unit 130 is used as the classification result. When the error determination result is "incorrect", "unknown" is used as the classification result. In this case, for example, a security operator manually determines the classification.

For example, it is assumed that the classification result by the classification estimation unit 130 based on the feature vector acquired by the data transformation unit 120 is classification A, and the feature vector of the classification estimation process information acquired in an estimation process of the classification A is [0.3 0.2 0.8 0.1 0.1 0.9 0.1 0.8 0.3].

The classification A and [0.3 0.2 0.8 0.1 0.1 0.9 0.1 0.8 0.3] are input to the error determination unit 150. When an error determination result for [0.3 0.2 0.8 0.1 0.1 0.9 0.1 0.8 0.3] is "correct," the classification A is used as a correct classification result.

Effects of Embodiments

Since the data classification apparatus 100 described above improves the accuracy of correct/incorrect determination of classification further than that in the conventional technique disclosed in NPL 1, the correct classification can be accurately determined. Thus, a burden on a user when classifying data can be reduced.

In other words, classification (correct classification) having a high possibility of being correct and classification (incorrect classification) having a low possibility of being correct can be accurately classified, and thus it is easy to select that the classification having a high possibility of being correct is not manually confirmed. As a result, a burden on a user when classifying data can be reduced.

More specifically, by arranging the external information acquisition unit 110 in a prior stage of the data transformation unit 120, information used for classification determination is expanded, and thus the classification accuracy of the classification estimation unit 130 improves. Further, by observing and combining a predicted score for each weak classifier in the classification estimation unit 130 to acquire observation data (feature vector) in a classification estimation process, information used for error determination is expanded, and thus accurate error determination is possible.

Summary of Embodiments

This specification describes at least a data classification apparatus, a data classification method, and a program described in the following items.

Item 1

A data classification apparatus, including:
  a data transformation unit configured to generate a feature vector by using classification target data;
  a classification estimation process observation unit configured to acquire, from a classification estimation unit configured to estimate classification of the classification target data and including a plurality of weak classifiers, observation information in a classification process based on the feature vector, and generate a classification estimation process feature vector based on the observation information; and
  an error determination unit configured to determine, in accordance with an input of the classification estimation process feature vector generated by the classification estimation process observation unit and a classification result output from the classification estimation unit to which the feature vector is input, whether the classification result is correct.

Item 2
The data classification apparatus according to item 1, wherein the data transformation unit generates the feature vector from the classification target data and external information corresponding to the classification target data.

Item 3
The data classification apparatus according to item 2, wherein the data transformation unit generates the feature vector from the classification target data and the external information by Onehot encoding and TF-IDF.

Item 4
The data classification apparatus according to item 3, wherein the classification target data is a signature, and the data transformation unit applies Onehot encoding to 5-tuple in the signature and applies TF-IDF to the external information.

Item 5
The data classification apparatus according to any one of items 1 to 4, wherein the classification estimation process observation unit generates the classification estimation process feature vector by coupling respective predicted scores output from the plurality of weak classifiers.

Item 6
The data classification apparatus according to any one of items 2 to 4, further including an external information acquisition unit configured to acquire the external information, wherein the external information acquisition unit extracts a reference destination from the classification target data and acquires external information corresponding to the reference destination.

Item 7
A data classification method performed by a data classification apparatus, including: generating a feature vector by using classification target data;
  acquiring, from a classification estimation unit configured to estimate classification of the classification target data and including a plurality of weak classifiers, observation information in a classification process based on the feature vector, and generating a classification estimation process feature vector based on the observation information; and
  determining, based on the classification estimation process feature vector generated in the generating and a classification result output from the classification estimation unit to which the feature vector is input, whether the classification result is correct.

Item 8
A program for causing a computer to operate as an individual unit in the data classification apparatus according to any one of items 1 to 6.

Although the present embodiments have been described above, the present invention is not limited to such a specific embodiment, and various modifications and changes can be made within the scope of the gist of the present invention described in the claims.

REFERENCE SIGNS LIST

100 Data classification apparatus
110 External information acquisition unit
120 Data transformation unit
130 Classification estimation unit
140 Classification estimation process observation unit
150 Error determination unit
160 Learning unit
1000 Drive device
1001 Recording medium
1002 Auxiliary storage device
1003 Memory device
1004 CPU
1005 Interface device
1006 Display device
1007 Input device

The invention claimed is:

1. A data classification apparatus, comprising:
  a data transformation unit, implemented using one or more computing devices, configured to generate a feature vector by using classification target data;
  a classification estimation process observation unit, implemented using one or more computing devices, configured to:
    acquire, from a classification estimation unit configured to estimate classification of the classification target data and including a plurality of classifiers, observation information in a classification process based on the feature vector, and
    generate a classification estimation process feature vector based on the observation information; and
  an error determination unit, implemented using one or more computing devices, configured to determine, in accordance with (i) an input of the classification estimation process feature vector generated by the classification estimation process observation unit and (ii) a classification result output from the classification estimation unit to which the feature vector is input, whether the classification result is correct,
  wherein the data transformation unit is configured to generate the feature vector from (i) the classification target data and (ii) external information corresponding to the classification target data, by applying Onehot encoding and a term frequency-inverse document frequency (TF-IDF).

2. The data classification apparatus according to claim 1, wherein:
  the classification target data is a signature, and the data transformation unit applies the Onehot encoding to 5-tuple in the signature and applies the TF-IDF to the external information.

3. The data classification apparatus according to claim 1, wherein:
  the classification estimation process observation unit is configured to generate the classification estimation process feature vector by coupling respective predicted scores output from the plurality of classifiers.

4. The data classification apparatus according to claim 1, further comprising:
  an external information acquisition unit, implemented using one or more computing devices, configured to acquire the external information,
  wherein the external information acquisition unit is configured to extract a reference destination from the classification target data and acquire external information corresponding to the reference destination.

5. A data classification method performed by a data classification apparatus, the data classification method comprising:
  generating a feature vector by using classification target data;

acquiring, from a classification estimation unit configured to estimate classification of the classification target data and including a plurality of classifiers, observation information in a classification process based on the feature vector;

generating a classification estimation process feature vector based on the observation information; and determining, based on the classification estimation process feature vector generated in the generating and a classification result output from the classification estimation unit to which the feature vector is input, whether the classification result is correct, wherein generating the feature vector comprises generating the feature vector from (i) the classification target data and (ii) external information corresponding to the classification target data, by applying Onehot encoding and a term frequency-inverse document frequency (TF-IDF).

6. A non-transitory computer readable medium having stored thereon a program for causing a computer to execute operations comprising:

generating a feature vector by using classification target data;

acquiring, from a classification estimation unit configured to estimate classification of the classification target data and including a plurality of classifiers, observation information in a classification process based on the feature vector;

generating a classification estimation process feature vector based on the observation information; and determining, based on the classification estimation process feature vector generated in the generating and a classification result output from the classification estimation unit to which the feature vector is input, whether the classification result is correct, wherein generating the feature vector comprises generating the feature vector from (i) the classification target data and (ii) external information corresponding to the classification target data, by applying Onehot encoding and a term frequency-inverse document frequency (TF-IDF).

7. The non-transitory computer readable medium according to claim 6, wherein the classification target data is a signature, and wherein the Onehot encoding is applied to 5-tuple in the signature and the TF-IDF is applied to the external information.

8. The non-transitory computer readable medium according to claim 6, wherein generating the classification estimation process feature vector comprises generating the classification estimation process feature vector by coupling respective predicted scores output from the plurality of classifiers included in the classification estimation unit.

9. The non-transitory computer readable medium according to claim 6, wherein the external information is acquired by extracting a reference destination from the classification target data and acquiring external information corresponding to the reference destination.

* * * * *